United States Patent
Wang et al.

(10) Patent No.: US 12,249,042 B2
(45) Date of Patent: Mar. 11, 2025

(54) METHOD AND SYSTEM TO COMBINE VIDEO FEEDS INTO PANORAMIC VIDEO

(71) Applicant: LENOVO (SINGAPORE) PTE. LTD, New Tech Park (SG)

(72) Inventors: Mengnan Wang, Chapel Hill, NC (US); John W. Nicholson, Cary, NC (US); Daryl C. Cromer, Raleigh, NC (US); Howard Locker, Cary, NC (US)

(73) Assignee: LENOVO (SINGAPORE) PTE. LTD, New Tech Park (SG)

( * ) Notice: Subject to any disclaimer, the term of this patent is extended or adjusted under 35 U.S.C. 154(b) by 0 days.

(21) Appl. No.: 17/701,958

(22) Filed: Mar. 23, 2022

(65) Prior Publication Data
US 2023/0316455 A1    Oct. 5, 2023

(51) Int. Cl.
*G03B 37/04* (2021.01)
*G06T 3/4038* (2024.01)
*H04N 7/18* (2006.01)

(52) U.S. Cl.
CPC ............ *G06T 3/4038* (2013.01); *G03B 37/04* (2013.01); *H04N 7/181* (2013.01)

(58) Field of Classification Search
CPC ....... G06T 3/4038; G03B 37/04; H04N 7/181
USPC .............................................. 348/36, 43, 135
See application file for complete search history.

(56) References Cited

U.S. PATENT DOCUMENTS

| | | | |
|---|---|---|---|
| 10,687,039 B1* | 6/2020 | Vaden | G06F 3/012 |
| 10,896,327 B1* | 1/2021 | Lablans | G06V 10/25 |
| 11,632,602 B2* | 4/2023 | Cier | H04N 23/698 |
| | | | 348/36 |
| 2018/0152673 A1* | 5/2018 | Kim | G08B 13/19656 |
| 2018/0324410 A1* | 11/2018 | Roine | H04N 23/698 |
| 2018/0343442 A1* | 11/2018 | Yoshikawa | H04N 21/438 |
| 2019/0080477 A1* | 3/2019 | Fukui | G06T 7/80 |
| 2019/0082160 A1* | 3/2019 | Yano | G06T 15/205 |
| 2021/0112228 A1* | 4/2021 | Yamamoto | H04N 13/111 |
| 2021/0183104 A1* | 6/2021 | Gope | G06T 7/20 |
| 2021/0289187 A1* | 9/2021 | Kwak | H04N 23/698 |
| 2022/0109822 A1* | 4/2022 | Winter | H04N 23/50 |
| 2022/0351519 A1* | 11/2022 | Kalirajan | H04N 7/181 |

\* cited by examiner

*Primary Examiner* — Thai Q Tran
*Assistant Examiner* — Stephen R Smith
(74) *Attorney, Agent, or Firm* — Dean D. Small; The Small Patent Law Group, LLC

(57) ABSTRACT

A computer implemented method, system and computer program product are provided that receive video feeds from corresponding cameras distributed at different positions and orientations throughout a physical environment, and obtain location data associated with the cameras. The location data is indicative of at least one of the position or orientation for the corresponding camera. The method, system and computer program product identify, from the multiple cameras, a camera combination that includes first and second cameras that have overlapping fields of view (FOV) based on the location data and form a panoramic video of at least a portion of the environment by combining the content from the first and second cameras identified based on the location data.

20 Claims, 4 Drawing Sheets

METHOD AND SYSTEM TO COMBINE VIDEO FEEDS INTO PANORAMIC VIDEO

FIELD

The present disclosure relates generally to manage which combinations of video feeds are stitched with one another to form a panoramic video.

BACKGROUND OF THE INVENTION

Today, video is presented to users in a variety of manners, including wide field of view videos, such as fully or partially panoramic videos (sometimes referred to as 360° videos). A wide field of view video presents a user with the ability to change a view direction within a wide field of view, up to a 360° view of a scene. The user may watch a video while panning left, right, up and down to see other portions of the surrounding scene.

To create the wide field of view video, some implementations utilize a lens/mirror system to capture the panoramic video with one camera. When the full panoramic video is captures with one camera, there is no need to apply stitching. As another example, a product has been proposed that uses two cameras each with 180 degree "fisheye" lenses. As another example, camera systems in a care provide a birds-eye-view by combining multiple camera feeds, but do not perform stitching. Separately, stitching technologies have been proposed for use more commonly with photos, but not with vide. On example is the Photosynth app and service by Microsoft Live Labs and the University of Washington, which analyzes digital photographs and generates a three-dimensional model of the photos and a point cloud of a photographed object. In this type of use case, the photo stitching app must apply an $N^2$ comparisons of images, where N represents the number of images. For example, if 1000 images of the Grand Canyon are pulsed from the internet, the stitching application does not know the exact vantage point of any of the 1000 images, and thus must compare all of the images to one another to determine how to best stitching the images together.

Another example of a photo stitching technique is used to make panoramic photos on a phone while the user spins the phone in a circle and continuously takes photos. In this case, the system knows the images are all from one camera and one vantage point, it knows the direction of motion, and it knows the time/sequence of images. Accordingly, every image need not be compared with one another to determine which combination of images should be compared.

Stitching techniques can be extended from a set of still images to several camera feeds/videos to form one wide field of view result (panoramic video). However, the same challenge remain when determining which video feeds should be combined with one another. One stitching approach requires camera sensors to be at a fixed location, to be pointed toward specific angles (e.g. car 360 view parking cam) and to come from one single device. This approach is very limiting in terms of the source of video content.

When it is desirable to stitch video feeds from multiple sources at unknown locations and unknown orientations, conventional approaches utilize complex additional preliminary analysis to determine how to combine the video feeds. The determination of how to combine the video feeds, requires a large number of calculations to determine where each video input is located and to determine the direction/orientation for where the video input is point before the actual stitching is applied. As with still images from unrelated sources, comparing each video feed for overlapping parts require $N^2$ comparison operations (where N is the number of discrete video feeds) to determine the orientation of each video feed, and the comparison analysis assumes that videos are overlapping.

A need remains for methods and systems that afford the user the ability to generate a panoramic (e.g., 360-degree) view from different video sources and have the output generated much faster, rather than waiting for the numerous video feeds to be analyzed (e.g., through cross correlation) to identify the combinations to be combined and then stitched with one another.

SUMMARY

In accordance with embodiments herein, computer implemented methods are provided that, under control of one or more processors, are configured with specific executable instructions. The method receives video feeds from corresponding cameras distributed at different positions and orientations throughout a physical environment, obtains location data associated with the cameras, the location data indicative of at least one of the position or orientation for the corresponding camera, identifies, from the multiple cameras, a camera combination that includes first and second cameras that have overlapping fields of view (FOV) based on the location data, and forms a panoramic video of at least a portion of the environment by combining the content from the first and second cameras identified based on the location data.

Additionally, or alternatively, the location data is obtained independent of content of the video feeds from the cameras. Additionally, or alternatively, the location data is obtained without comparing the content from any of the video feeds with one another. Additionally, or alternatively, at least one of the multiple cameras moves are stationary within the environment while capturing the corresponding video feeds. Additionally, or alternatively, the method further comprises: receiving distance information from range sensors, the distance information indicative of a distance from the corresponding range sensor to objects within the FOV of the corresponding camera; and analyzing the distance information associated with the cameras to calculate the location data for the corresponding cameras.

Additionally, or alternatively, the method further comprises comparing the distance information associated with the first and second cameras to calculate the position and orientation of at least the second camera relative to at least one of i) a reference origin and orientation or ii) the position and orientation of the first camera.

Additionally, or alternatively, the obtaining the location data further comprises calculating the location data based on information from at least one of geolocation device or gyroscopic devices associated with the cameras. Additionally, or alternatively, the method further comprises receiving at least one of time-of-flight (ToF) or distance information from the geolocation devices associated with the cameras; and analyzing the at least one of ToF or distance information associated with the cameras to calculate the location data for the corresponding cameras. Additionally, or alternatively, the method further comprises: presenting a graphical representation of the physical environment on a display, the representation including camera graphical representations of the cameras; receiving at least one of a position or orientation adjustment input at a user interface indicating an adjustment to at least one of a position or orientation of the camera graphical representation on the display; and utilizing at least one of the position or orientation information to calculate the location data. Additionally, or alternatively, wherein the panoramic video represents an interactive augmented reality environment.

In accordance with embodiments herein, a system is provided that comprises: a video input configured to receive video feeds from corresponding cameras distributed at different positions and orientations throughout a physical environment; a processor; and a memory storing instructions accessible by the processor, wherein, responsive to execution of the instructions, the processor configured to: obtain location data associated with the cameras, the location data indicative of at least one of the position or orientation for the corresponding camera; identify, from the multiple cameras, a camera combination that includes first and second cameras that have overlapping fields of view (FOV) based on the location data; and form a panoramic video of at least a portion of the environment by combining the content from the first and second cameras identified based on the location data.

Additionally, or alternatively, the processor is further configured to obtain the location data without comparing the content from any of the video feeds with one another. Additionally, or alternatively, the system further comprises multiple cameras configured to remain stationary within the environment while capturing the corresponding video feeds. Additionally, or alternatively, the processor is further configured to: receive distance information from range sensors, the distance information indicative of a distance from the corresponding range sensor to objects within the FOV of the corresponding camera; and analyze the distance information associated with the cameras to calculate the location data for the corresponding cameras.

Additionally, or alternatively, the processor is further configured to: compare the distance information associated with the first and second cameras to calculate the position and orientation of at least the second camera relative to at least one of i) a reference origin and orientation or ii) the position and orientation of the first camera. Additionally, or alternatively, the processor is further configured to: receive at least one of time-of-flight (ToF) or distance information from geolocation devices associated with the cameras; and analyze the at least one of ToF or distance information associated with the cameras to calculate the location data for the corresponding cameras.

Additionally, or alternatively, the system further comprises: a display configured to present a graphical representation of the physical environment, the representation including camera graphical representations of the cameras; and a user interface configured to receive at least one of a position or orientation adjustment input indicating an adjustment to at least one of a position or orientation of the camera graphical representation on the display, the processor further configured to utilize at least one of the position or orientation information to calculate the location data.

In accordance with embodiments herein, a computer program product comprising a non-signal computer readable storage medium comprising computer executable code to: receive video feeds from corresponding cameras distributed at different positions and orientations throughout a physical environment; obtain location data associated with the cameras, the location data indicative of at least one of the position or orientation for the corresponding camera; identify, from the multiple cameras, a camera combination that includes first and second cameras that have overlapping fields of view (FOV) based on the location data; and form a panoramic video of at least a portion of the environment by combining the content from the first and second cameras identified based on the location data.

Additionally, or alternatively, the computer executable code is further to receive distance information from range sensors, the distance information indicative of a distance from the corresponding range sensor to objects within the FOV of the corresponding camera; and analyze the distance information associated with the cameras to calculate the location data for the corresponding cameras. Additionally, or alternatively, the computer executable code is further to: present a graphical representation of the physical environment on a display, the representation including camera graphical representations of the cameras; receive at least one of a position or orientation adjustment input at a user interface indicating an adjustment to at least one of a position or orientation of the camera graphical representation on the display; and utilize at least one of the position or orientation information to calculate the location data.

DETAILED DESCRIPTION

It will be readily understood that the components of the embodiments as generally described and illustrated in the Figures herein, may be arranged and designed in a wide variety of different configurations in addition to the described example embodiments. Thus, the following more detailed description of the example embodiments, as represented in the Figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation.

The following description is intended only by way of example, and simply illustrates certain example embodiments.

Definitions

The terms "up", "down", "left", "right", "pan" and "elevation" shall define directions with respect to the display and/or interface of the device.

The term "augmented reality" refers to superimposing computer generated virtual models in real-time on a user's view of the real world.

The term "panoramic video" refers to a video recording that includes a continuous view in multiple directions. Non-limiting examples of a panoramic video is a 360-degree video, a spherical video, three-dimensional (3D) video and an immersive video. The panoramic video may not provide a full 360° panoramic view of a scene, but instead will at least provide more than a 180° panoramic view of a scene (in the left/right or panning direction), and/or more than a 90° view of a scene (in the up/down or tilt direction). The panoramic video may not include a 180° elevation range with a view directly above and/or below the camera (origin). Instead, the panoramic video may include an elevation range of 100°-170°, without a view of the scene directly above and/or below the camera. A 3D video represents a panoramic video that includes depth information as well. The video recordings are recorded in multiple directions at the same time, such as when utilizing a collection of cameras. During playback the viewer has control of the viewing direction (e.g., a panorama).

System Overview

Figure 1:
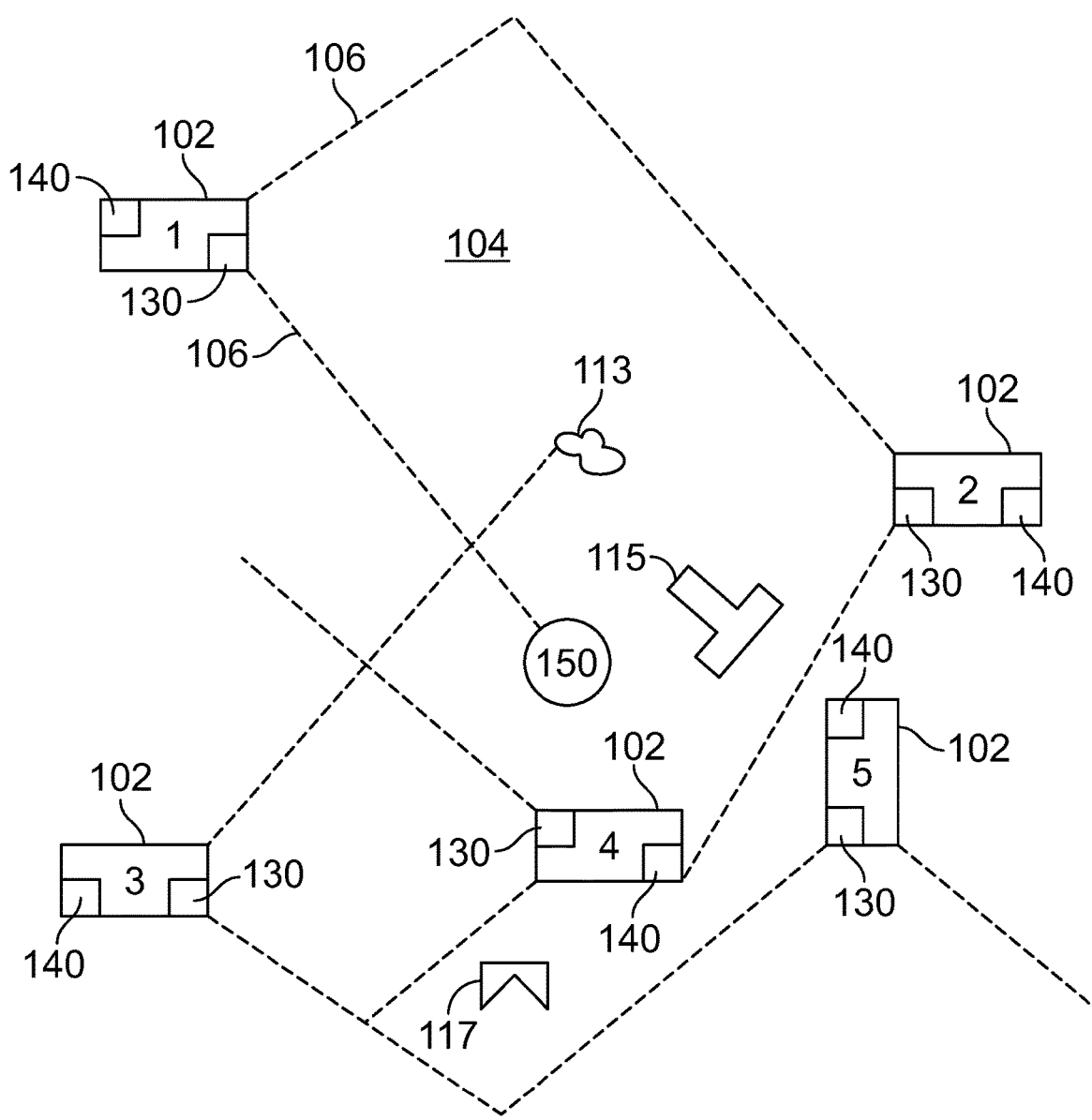
FIG. 1 illustrates a system formed in accordance with embodiments herein.

FIG. 1 illustrates a system 100 formed in accordance with embodiments herein. The system 100 includes cameras 102 distributed at different positions and orientations throughout a physical environment. For reference, the cameras 102 are labeled cameras 1-5. Each camera 102 has a corresponding field of view (FOV) 104 denoted by dashed lines 106. The cameras 102 capture video content associated with the portion of the environment that is within the corresponding FOV 104.

One or more electronic devices 110 are provided to utilize the video content from the cameras 102. The electronic device 110 includes one or more processors 112 configured to execute program instructions stored in memory 114. The electronic device 110 includes video inputs 120 configured to receive video feeds with the video content from the cameras 102 distributed at different positions and orientations throughout the physical environment. The processor 112 obtains location data associated with the cameras 102. The location data is indicative of at least one of the position or orientation for the corresponding camera 102. The processor 112 obtains the location data independent of content of the video feeds from the cameras in one of various methods described herein. As explained herein, the location data is obtained without comparing the content from any of the video feeds with one another.

In accordance with some embodiments, range sensors 130 are co-located with and/or formed integral to, the cameras 102. The range sensors 130 have a range FOV that substantially corresponds to the FOV of the associated camera 102. For example, the range sensors 130 may be a light detection and ranging (LiDAR) type sensor, also referred to as a 3D laser scanner, that determines range (variable distance) by targeting an object with a laser and measuring the time for the reflected light to return to the receiver. Optionally, other types of range sensors 130 may be used.

The range sensors 130 collect distance information in connection with the associated cameras 102. The distance information indicates a distance from the corresponding range sensor 130 to objects within the FOV of the corresponding camera 102. The processor 112 compares the distance information associated with the cameras to calculate the location data for the corresponding cameras. For example, the processor 112 may compare the distance information associated with the first and second cameras 102 (e.g., camera 1 and camera 2) to calculate the position and orientation of at least the second camera 102 relative to at least one of i) a reference origin and orientation or ii) the position and orientation of the first camera 102.

Figure 4:
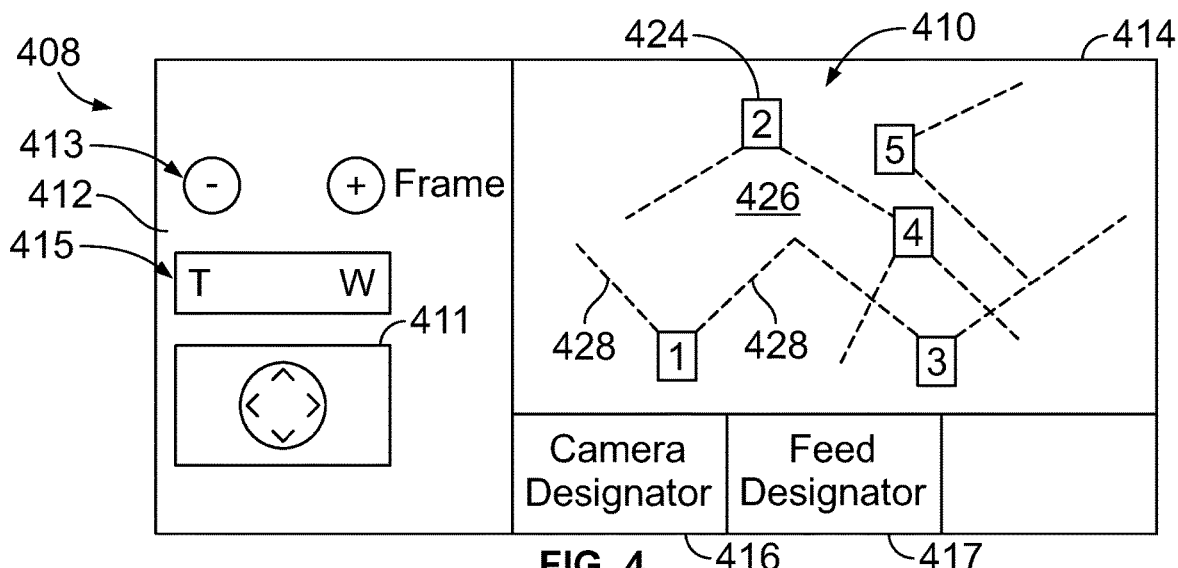
FIG. 4 illustrates a user interface that may be implemented on the device in accordance with embodiments herein.

Additionally, or alternatively, the processor 112 may obtain the location data based on position and/or orientation information entered by a user through the user interface 118 or user interface 410 of FIG. 4. For example, the user interface 118, 410 may display a graphical representation of the physical environment along with graphical indicia indicative of each of the cameras 102. The user may be afforded the opportunity to move and/or re-orient the graphical representations of the cameras to positions and/or orientations corresponding to the actual position and/or orientation of each of the cameras 102 in the physical environment. The graphical representations of the cameras 102 may further indicate the field-of-view of each camera, such as in the manner shown in FIGS. 1 and 4. The user interface 118 enables the user to see the FOV 104 for each of the cameras which enables the user to further specify which, if any, portions of the 360° view are to be left blank. The processor 112 may then utilize the position and/or orientation information entered by the user to compare and determine specific locations for each video feed, as well as which combinations of the video feed should be combined (e.g., fused or stitched).

Optionally, the processor 112 may further be configured to identify blind or blank portions within the 360° view. The processor 112 may be configured to fill in the blind region, such as with repeating segments from the real video content from video feeds adjacent to the blank region. Additionally, or alternatively, the blank region may be filled with a computer generated simulation of the systems "best estimate" of the content of the blind region.

Additionally, or alternatively, embodiments may utilize geolocation and/or gyroscopic devices 140 to collect position and orientation information that is utilized to calculate the location data. For example, the device 140 may include a gyroscope, a GPS chip, a ultrawideband (UWB) chip and/or other type of geolocation device that is able to obtain detailed position information relative to other sources (e.g., GPS reference source(s), gravity, other UWB devices, and/or other geolocation devices). In the example of a UWB implementation, the UWB signals can precisely detect location due to distance-based measurements via time-of-flight (ToF), that calculates location based on how long it takes for pulses of radio to travel from one device to another. For example, the devices 140 may each include a UWB chipset that calculates ToF information between pairs of the devices 140. The ToF information may then be utilized by the processor 112 to calculate position and/or orientation information and more generally location data. It is recognized that UWB is one potential solution and that alternative technologies may be used to obtain similar information regarding the distance between the cameras 102 and/or more generally the geolocation of the cameras 102. The position and/or orientation information from devices 140 may be utilized by the processor 112 to significantly reduce the processing time to determine which video feeds should be stitched with one another.

Additionally, or alternatively, embodiments may utilize a supplemental camera, such as, camera 150 that is located within the physical environment in a manner to see the entire physical environment. For example, camera 150 may represent a top mounted camera positioned overhead of a room corresponding to the physical environment (e.g., a meeting room, classroom, or other space). As another example, the supplemental camera 150 may be positioned in a corner of a room in a manner that the entire room is visible. As one example, the supplemental camera may represent a closed circuit television (CCTV) camera. The content captured by the supplemental camera 150 is not stitched with or otherwise combined with the video feeds from the cameras 102. Instead, the content captured by the supplemental camera 150 is analyzed by the processor 112, such as by using object recognition algorithms, to identify the position and/or orientation of each of the cameras 102, as well as the corresponding FOV's.

Additionally, or alternatively, embodiments may utilize augmented reality (AR) techniques to determine position and/or orientation of the cameras 102. For example, the Simultaneous Localization and Mapping (SLAM) technology may be utilized to detect feature points in the physical environment. SLAM technology enables AR applications to recognize 3D objects and scenes, as well as to instantly track objects in a physical environment. The processor 112 may utilize SLAM methods or other AR methods to analyze the content of one or more of the video feeds to identify other cameras 102 within a FOV of one or more cameras 102. The processor 112 may further utilize SLAM methods or other AR methods to determine position and/or orientation of the cameras by just analyzing image data from the video feeds. As one example, the processor 112 may utilize "inside-out tracking". Optionally, trackers such as inertial measurement units (IMUs) may be included to measure velocity, orientation and gravitational forces. The processor 112 may utilize the information from the tracker to determine positions and orientations of the cameras 102. It should be recognized that the aspects of SLAM and other AR methods utilized herein do not compare video content from multiple video feeds to one another.

Optionally, once the content from the supplemental camera 150 is analyzed to identify each of the cameras, the user interface 118 may afford the user the option to provide an input designating which video feed corresponds to each of the cameras identified in the content from the supplemental camera 150. With minimal user input, the process enables much faster orientation solving and faster processing times.

Optionally, various combinations of the foregoing embodiments may be utilized to obtain location and/or orientation information for each of cameras. The more information provided, the faster the overall process is able to determine video feed orientations and to reduce, the processing time to a single calculation.

The foregoing embodiments provide position and/or orientation information relative to a local or global reference device/point/system, from which location data is derived. For example, the processor 112 may determine location data that defines a physical point in the environment for each camera. For example, the point may utilize latitude and longitude coordinates, XYZ coordinates or another location descriptor. The physical point may be provided relative to a reference origin such as utilizing world coordinates (e.g., a latitude/longitude), or a local coordinate system. For example, the physical environment may have a local coordinate system with a defined "origin" such as a center or corner of a room or space. Additionally, or alternatively, the location data may identify a specific orientation relative to a reference orientation. For example, the orientation may be provided in terms of Euler angles (e.g., pitch, roll and yaw) or any other predefined reference orientation.

The processor 112 identifies one or more camera combinations with overlapping FOVs based on the location data. For example, the processor 112 identifies, from the multiple cameras 102, all or a subset of the cameras 102 (e.g., first camera 1 and second camera 2) have overlapping FOVs 104 based on the location data. In accordance with new and unique aspects herein, one or more of the cameras 102 are able to move or remain stationary within the physical environment while capturing the corresponding video feeds. The processor 112 forms a panoramic video of at least a portion of the physical environment by combining the content from the subset of cameras identified based on the location data. Additionally, or alternatively, the incoming video content may include, or the processor 112 may add, depth information to form a three-dimensional (3D) video within the panoramic video.

For example, the device 110 may operate with a wearable device 122 to provide an interactive experience for a user, where the interactive experience is based in part on the physical environment surrounding the cameras 102. The processor 112 and wearable device 122 may present an augmented reality environment to the user, such as by adding one or more digital elements to a real world fully or partially panoramic video experience. Optionally, the processor 112 and wearable device 122 may present a mixed reality experience which combines portions of the real world fully or partially panoramic video with virtual reality video.

Figure 2:
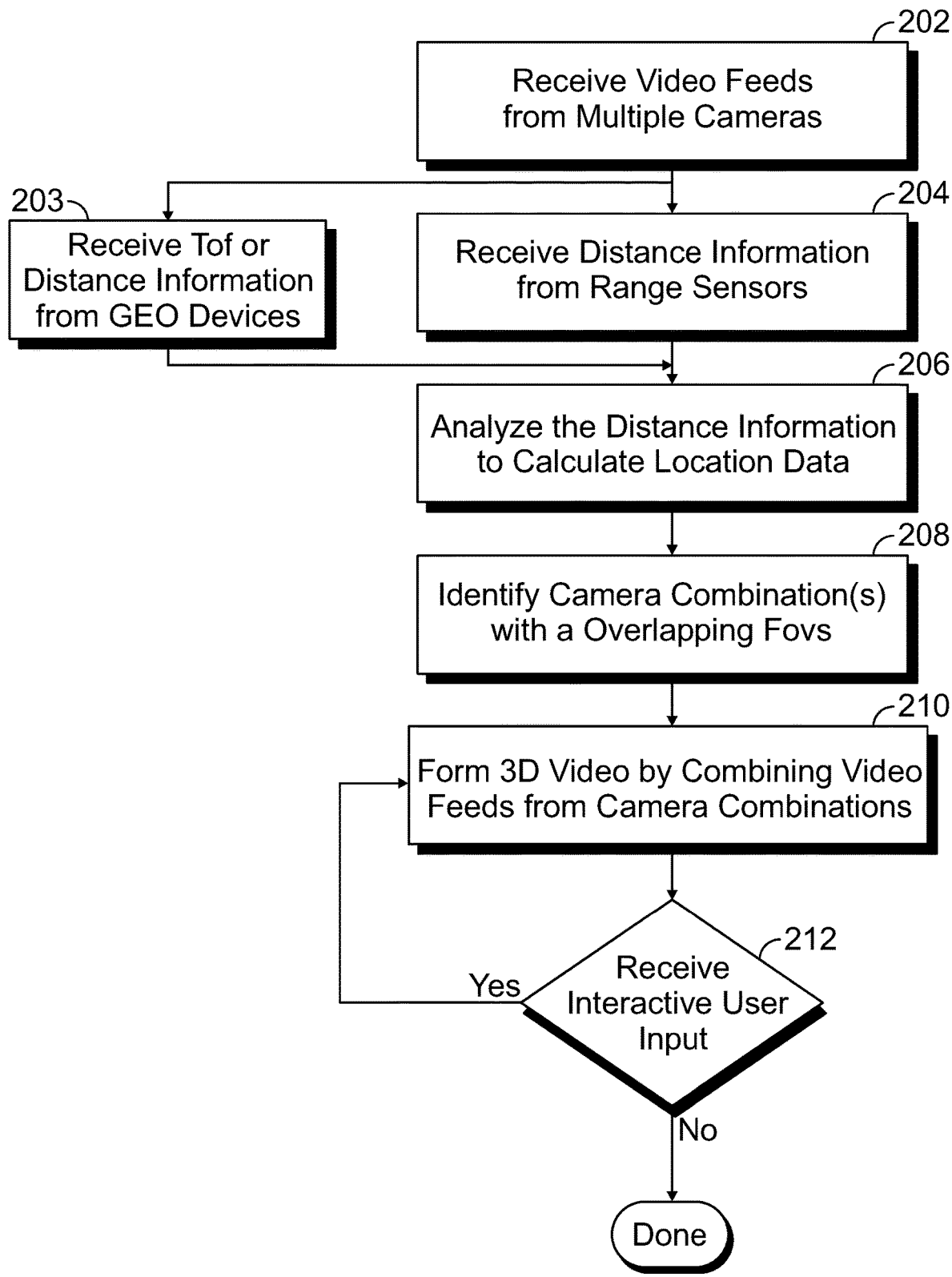
FIG. 2 illustrates a process implemented in accordance with embodiments herein for managing selection of video feeds to combine.

FIG. 2 illustrates a process implemented in accordance with embodiments herein for managing selection of video feeds to combine. The process of FIG. 2 may be implemented all or in part by the electronic device 110 and/or in combination with other electronic devices. At 202, the video inputs 120 receive content in the video feeds from the cameras 102. While the operations described in connection with FIG. 2 are shown in one order, it is recognized that the order of the operations may be changed. For example, the operations at 204-208 may be performed first, before the operation at 202 for receiving the content from the video feeds.

FIG. 2 illustrates two branches, at 203 and 204, that may be performed as alternatives or in parallel. The branches at 203 and 204 represent options for collecting non-video content information that can be utilized to calculate location data for the cameras 102.

The branch at 203 utilizes non-video content information from geolocation and/or gyroscopic devices 140 mounted to or within the cameras 102. For example, the devices 140 may communicate with one another utilizing UWB signals to precisely detect relative locations of the devices 140 (and thus the cameras 102) based on distance-based measurements via time-of-flight (ToF), namely how long it takes for pulses of radio waves in the UWB wave-length(s) to travel from one device 140 to another device 140. The devices 140 may then deliver the ToF information or the resulting distances to the processor 112. With reference to FIG. 1, a device 140 in camera 1 may provide a list of time-of-flight values and/or list of distances between camera 1 and each of the other cameras 2-5. Similarly, a device 140 in camera 2 may provide a list of time-of-flight values and/or list of distances between camera 2 and each of the other cameras 1, 3-5. A device 140 in camera 3 may provide a list of time-of-flight values and/or list of distances between camera 3 and each of the other cameras 1-2 and 4-5, while same occurs for cameras 4 and 5.

The branch at 204, utilizes non-video content information from range sensors. At 204, the electronic device 110 receives the distance information from range sensors 130.

Additionally, or alternatively, the processor 112 may utilize AR methods (e.g., SLAM methods) to analyze the content of one or more of the video feeds to identify other cameras 102 within a FOV of one or more cameras 102. The processor 112 may further utilize the AR methods to determine position and/or orientation of the cameras by analyzing image data from the video feeds. As one example, the processor 112 may utilize "inside-out tracking". For example, the processor 112 may analyze image content from the video feeds to observe features of interest in the physical environment. The processor 112 may then fuse the image analysis information with IMU data or data from another tracker, to determine a precise position and/or orientation of each camera 102 in the physical environment. It should be recognized that the aspects of SLAM and other AR methods utilized herein do not compare video content from multiple video feeds to one another.

At 206, the processor 112 analyzes the ToF information and/or the distance information, obtained at 203 and/or at 204, to calculate location data. For example, in connection with the example of FIG. 1, when the distance information is from the range sensor 130 associated with camera 1, the processor 112 may identify ranges X1 and Y1 to objects 113 and 115, while the distance information from the range sensor 130 associated with camera 3 may identify ranges X3 and Y3 to the same two objects 113 and 115. Further, the distance information from the range sensor 130 associated with camera 2 may identify ranges X2 and Y2 to same objects 113 and 115. Based on the distance information, the processor 112 calculates locations and orientations of cameras 1, 2 and 3.

Additionally, or alternatively, the distance information may correspond to a distance to a camera in the FOV of a range sensor 130. For example, the distance information from the range sensor 130 associated with camera 1 may identify a range X1 to camera 2, while the distance information from the range sensor 130 associated with camera 3 may identify a range X3 to the same camera 2. Further, the distance information from the range sensor 130 associated with camera 2 may identify ranges X2 and Y2 to the cameras 1 and 3. Based on the distance information, the processor 112 calculates locations and orientations of cameras 1, 2 and 3.

At 208, the processor 112 identifies one or more camera combinations with overlapping FOVs based on the location data. For example, the processor 112 may utilize the location data (e.g., position and orientation information) to construct a model for the physical environment and to overlay camera positions and orientations onto the model. The processor 112 determines the FOV for each camera 102 and determines which cameras 102 are within the FOV of which other cameras 102. With reference to FIG. 1, the processor 112 determines, based on the position and orientation of cameras 1-3, that cameras 1 and 3 are in the FOV of camera 2, camera 2 is in the FOV of camera 1, and camera 2 is also in the FOV of camera 3. Accordingly, cameras 1, 2 and 3 are designated to be a first camera combination for which the video feeds can be combined into a panoramic video.

Following the foregoing process, the processor 112 further designates: i) a second camera combination should include cameras 3 and 4, ii) a third camera combination should include cameras 3 and 4, iii) a fourth camera combination should include cameras 1, 3 and 5, iv) a fifth camera combination should include cameras 2, 3, and 4. Optionally, more, fewer or different cameras may be included in other camera combinations.

At 210, the processor 112 begins forming a panoramic video of the physical environment by combining the content from the video feeds for the designated camera combinations. The content from the corresponding video feeds may be combined in various manners, such as utilizing known stitching or fusion techniques. Optionally, the panoramic video may be utilized to form an augmented reality environment by superimposing computer generated virtual models in real-time on a user's view of the real world as shown through the panoramic video.

Optionally, when providing interactive panoramic video, flow moves to 212. At 212, the processor 112 determines whether an interactive user input has been received. When an interactive user input is received, flow returns to 210 and the panoramic video is updated based on the input. Otherwise, the process plays the panoramic video until the user ends the process.

Figure 3:
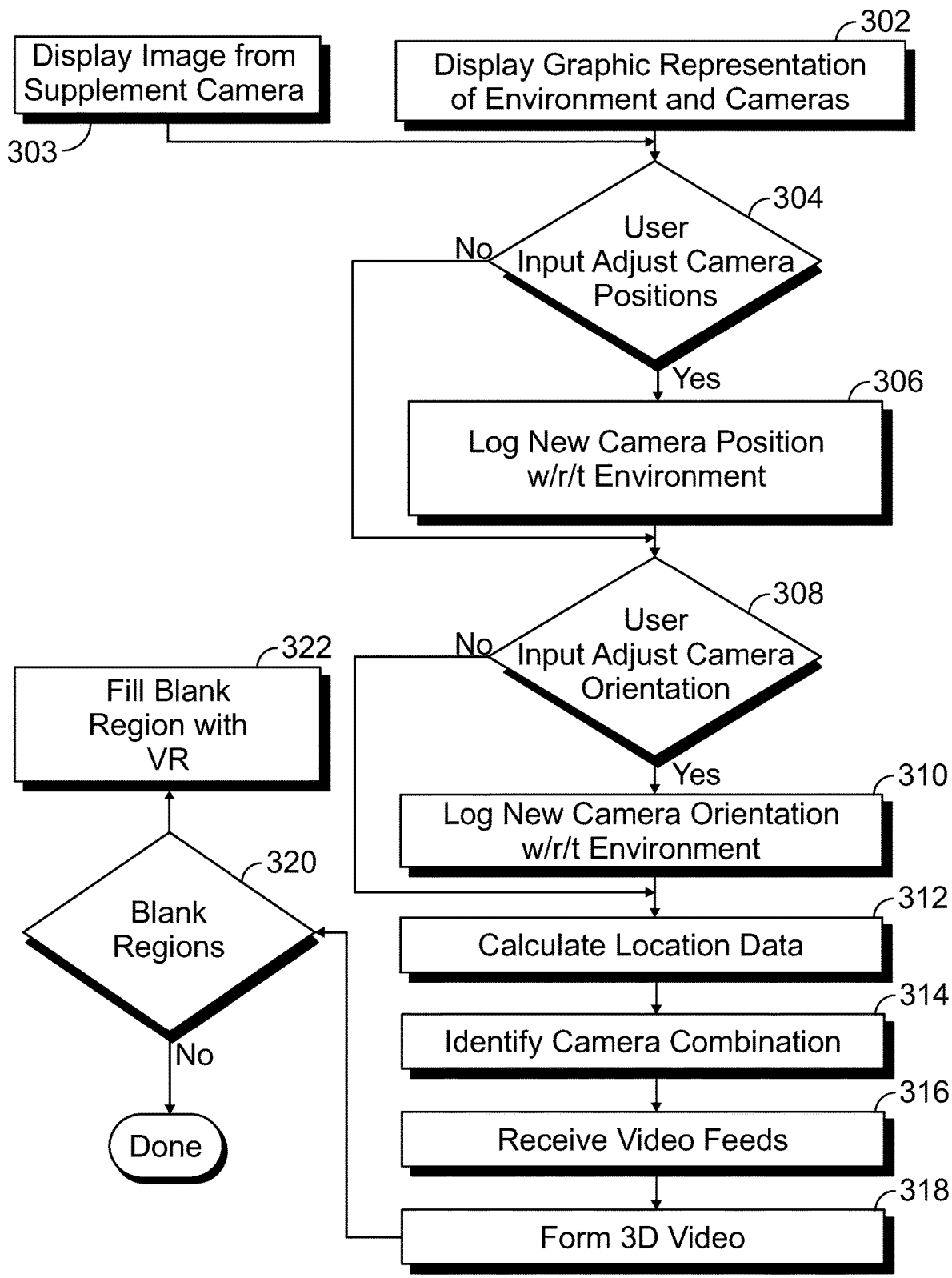
FIG. 3 illustrates a process implemented in accordance with embodiments herein for managing selection of video feeds to combine.

FIG. 3 illustrates a process implemented in accordance with embodiments herein for managing selection of video feeds to combine. The process of FIG. 3 may be implemented all or in part by the electronic device 110 and/or in combination with other electronic devices. While the operations described in connection with FIG. 3 are shown in one order, it is recognized that the order of the operations may be changed. For example, the operations at 302-314 may be performed first or after, before the operation at 316 for receiving the content from the video feeds.

FIG. 3 illustrates two starting points, at 302 and 303, that may be performed as alternatives or in combination. The starting points 302 and 303 represent options for collecting non-video content information that can be utilized to calculate location data for the cameras 102.

At 302, the processor 112 presents a graphical representation of the environment on the display 116 to the user. The representation may include camera graphical representation of the cameras as well, such as in a key or border, at previously entered locations in the environment, at predefined reference locations, or otherwise.

Additionally, or alternatively, at 303, a supplemental image may be displayed where the image is from a supplemental camera (e.g., 150) that is located within the physical environment in a manner to see the entire physical environment. For example, the image may represent a birds eye view of the physical environment, when a top mounted camera is positioned overhead of a room. As another example, the image may be from a corner perspective in a manner that an entire room is visible. The supplemental image is not stitched with or otherwise combined with the video content from the video feeds from the cameras 102. Instead, the image captured by the supplemental camera 150 is analyzed by the processor 112, such as by using object recognition algorithms, to identify the position and/or orientation of each of the cameras 102, as well as the corresponding FOVs. When a supplemental image is utilized at 303, optionally, the operations at 304 to 310 may be omitted and flow simply move from 303 to 312. Alternatively, it may be desirable to afford the user the option to adjust camera positions and/or orientations, in which case flow would move from 303 to 304.

At 304, the processor 112 determines whether a position adjustment input has been received that adjusts the positions of the camera graphical representation on the display. For example, a user may use the user interface to select and move/drag a camera to a new location (e.g., use a mouse to "click and drag"). If not, flow skips to 308. If a user input adjusts the position, flow moves to 306. At 306, the processor 112 logs the new position of the camera graphical representation with respect to the environment. As part of the logging process, the processor 112 updates position information for the corresponding camera. The position information may be longitude/latitude coordinates, an XYZ position with respect to a coordinate system and the like.

At 308, the processor 112 determines whether an orientation adjustment input has been received that adjusts the orientation of the camera graphical representation on the display. For example, a user may use the user interface to select and rotate/pivot a camera to a new orientation (e.g., use a mouse to "click and turn"). If not, flow skips to 312. If a user input adjusts the orientation, flow moves to 310. At 310, the processor 112 logs the new orientation of the camera graphical representation with respect to the environment. As part of the logging process, the processor 112 updates orientation information for the corresponding camera. The orientation information may be pitch, roll and yaw values and the like.

At 312, the processor 112 utilizes the position and orientation information to calculate the location data for each camera, such as described herein.

At 314, the processor 112 identifies one or more camera combinations with overlapping FOVs based on the location data. For example, the processor 112 may utilize the location data (e.g., position and orientation information) to construct a model for the physical environment and to overlay camera positions and orientations onto the model. The processor 112 determines the FOV for each camera 102 and determines which cameras 102 are within the FOV of which other cameras 102.

At 316, the process 112 begins to receive the content from the video feeds. At 318, the processor 112 begins forming a panoramic video of the physical environment by combining the content from the video feeds for the designated camera combinations. The content from the corresponding video feeds may be combined in various manners, such as utilizing known stitching or fusion techniques. Optionally, the panoramic video may be utilized to form an augmented reality environment by superimposing computer generated virtual models in real-time on a user's view of the real world as shown through the panoramic video. While not shown, optionally, an interactive panoramic video may be utilized in the manner described above in connection with FIG. 2.

Optionally, an operation may be added to address blank or blind regions in the panoramic video. At 320, the processor 112 determines whether the configuration of cameras does not cover an entire physical environment. For example, a region of the physical environment may be outside the FOV of all of the cameras and thus represent a blind region. The determination at 320 may be performed automatically by the processor 112 based on analysis of the FOVs for the entire group of cameras. Additionally, or alternatively, the determination at 320 may be based on a user input. When the user enters information to position and orient the cameras, the user may also utilize the user interface to designate one or more blank regions of the physical environment that are outside all FOVs or otherwise unviewable by the cameras. When a blank region is determined, flow moves to 322. At 322, the processor 112 automatically creates computer generated content to fill the blank region. For example, the blind region may be filled with repeating segments from the real video content from video feeds adjacent to the blank region. Additionally, or alternatively, the blank region may be filled with a computer generated simulation of the systems "best estimate" of the content of the blank region.

FIG. 4 illustrates a user interface 408 that may be implemented on the device 110 in accordance with embodiments herein. The user interface 408 may be entirely or only partially touch sensitive. The user interface 408 generally includes an input area 412 and a display area 410. The input area 412 may include one or more buttons, soft-keys, switches and the like, to receive inputs from the user in connection with carrying out various operations supported by the device 110.

The display area 410 includes a scene window 414. The scene window 414 displays a real physical environment image from the supplemental camera 150 and/or a graphical representation of the physical environment. The input area 412 includes various user inputs. The input area 412 includes frame step inputs 413 that may be utilized to step forward or backward one or more frames of the images from one or more supplemental cameras 150, such as in connection with identifying preferred frame to use for designating camera positions and/or orientations. The input area 412 includes a widened/telephoto input 415 to zoom in and out. A view angle adjustment control 411 allows the user to adjust the field-of-view, such as panning left or right and/or adjusting the elevation of view upward and downward when the supplemental camera 150 supports such options. Optionally, the input area 412 also includes camera and feed designate icons 416, 417 that are utilized when the user is identifying a camera 102 to be associated with a particular video feed.

The scene window 414 presents the real physical environment image from the supplemental camera 150 and/or a graphical representation of the physical environment. As explained herein, graphical representations of the cameras 424 may be presented to inform the user of positions and/or orientations of the cameras 424. The scene window 414 may also display boundaries 428 for the corresponding FOVs 426 for each of the cameras 424. The user may enter position and/or orientation adjustments to the cameras 424 through the user interface.

The above examples for the display format, display content, indicia and the like are not to be construed as limited. It is recognized that numerous other display formats, display content, and indicia may be used to output adjustment suggestions. It is recognized that the indicia may be formatted in various manners and presented without or outside the scene window 414.

Figure 5:
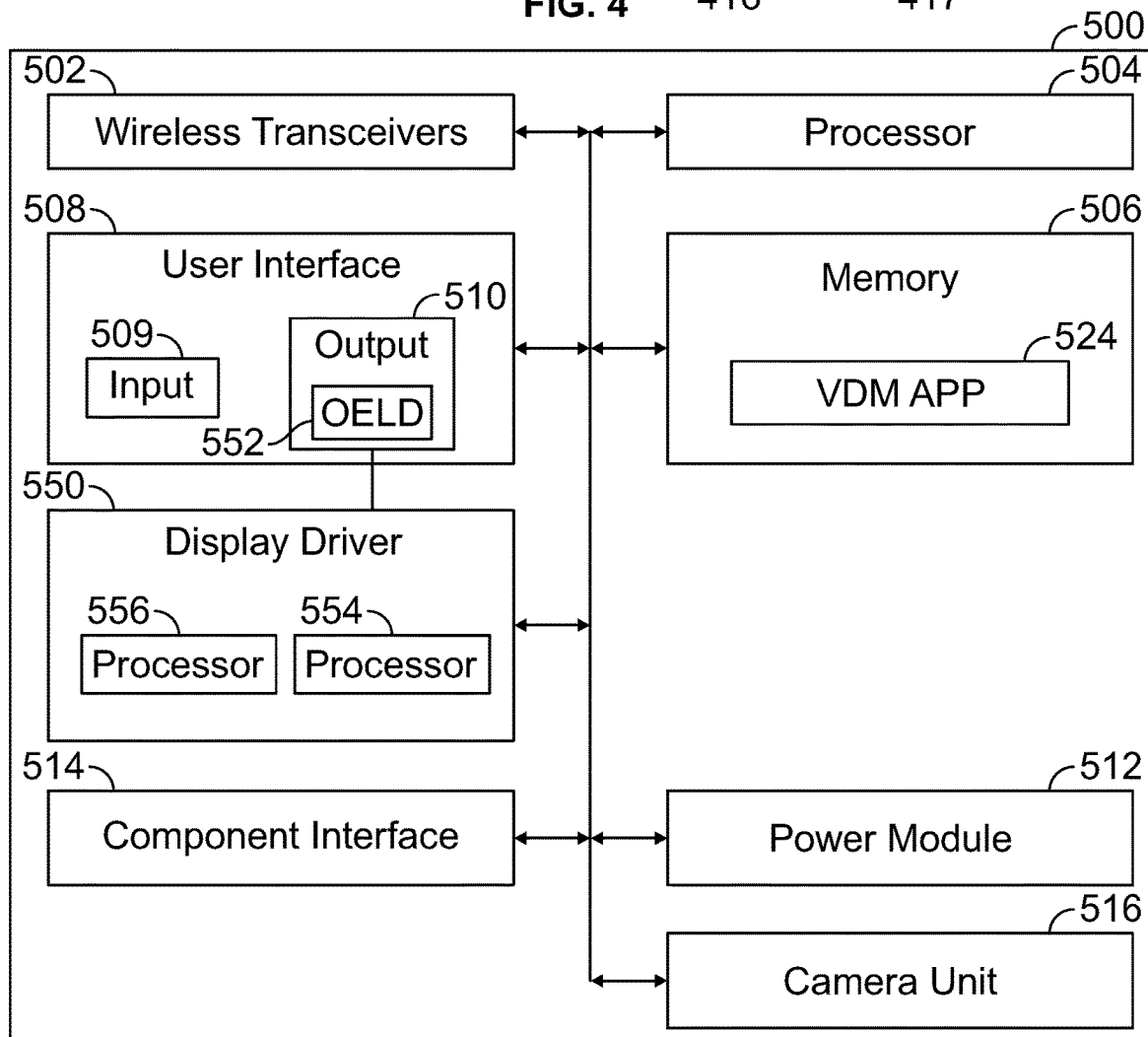
FIG. 5 illustrates a simplified block diagram of internal components of an electronic device configured in accordance with alternative embodiments herein.

FIG. 5 illustrates a simplified block diagram of internal components of an electronic device 500 configured in accordance with alternative embodiments herein. The device 500 includes components such as one or more wireless transceivers 502, one or more processors 504 (e.g., a microprocessor, microcomputer, application-specific integrated circuit, etc.), one or more memory (also referred to as a memory) 506, a user interface 508 which includes one or more input devices 509 and one or more output devices 510, a power module 512, a component interface 514 and a camera unit 516. All of these components can be operatively coupled to one another, and can be in communication with one another, by way of one or more internal communication links, such as an internal bus. The camera unit 516 may capture one or more frames of image data and/or video content.

For example, the device 500 may be utilized as one of the cameras to capture a video feed within the physical environment as well as to manage the designation of camera combinations and generate the panoramic video. For example, the device 500 may represent one user's smart phone or AR device. The device receives wired or wireless video feeds from multiple other devices (e.g., smart phones for a group of friends).

The input and output devices 509, 510 may each include a variety of visual, audio, and/or mechanical devices. For example, the input devices 509 can include a visual input device such as an optical sensor or camera, an audio input device such as a microphone, and a mechanical input device such as a keyboard, keypad, selection hard and/or soft buttons, switch, touchpad, touch screen, icons on a touch screen, a touch sensitive areas on a touch sensitive screen and/or any combination thereof. Similarly, the output devices 510 can include a visual output device, one or more light emitting diode indicators, an audio output device such as a speaker, alarm and/or buzzer, and a mechanical output device such as a vibrating mechanism. The display may be touch sensitive to various types of touch and gestures. As further examples, the output device(s) 510 may include a touch sensitive screen, a non-touch sensitive screen, a text-only display, a smart phone display, an audio output (e.g., a speaker or headphone jack), and/or any combination thereof. Optionally, the input devices 509 may include one or more touch sensitive layers provided on the front and/or rear sides of the display 552. The output devices 510 include a flexible display layer, such as an OLED display 552.

The transceiver 502 can utilize a known wireless technology for communication. The transceiver 502 may receive multiple video feeds wirelessly from other devices/cameras. Exemplary operation of the wireless transceivers 502 in conjunction with other components of the device 500 may take a variety of forms and may include, for example, operation in which, upon reception of wireless signals, the components of device 500 detect communication signals from secondary devices and the transceiver 502 demodulates the communication signals to recover incoming information, such as responses to inquiry requests, voice and/or data, transmitted by the wireless signals. The processor 504 formats outgoing information and conveys the outgoing information to one or more of the wireless transceivers 502 for modulation to communication signals. The wireless transceiver(s) 502 convey the modulated signals to a remote device, such as a cell tower or a remote server (not shown).

The memory 506 can encompass one or more memory devices of any of a variety of forms (e.g., random access memory, static random access memory, dynamic random access memory, etc.) and can be used by the processor 504 to store and retrieve data. The data that is stored by the memory 506 can include, but need not be limited to, operating systems, applications, user collected content and informational data. Each operating system includes executable code that controls basic functions of the device, such as interaction among the various components, communication with external devices via the wireless transceivers 502 and/or the component interface 514, and storage and retrieval of applications and data to and from the memory 506. Each application includes executable code that utilizes an operating system to provide more specific functionality for the communication devices, such as file system service and handling of protected and unprotected data stored in the memory 506.

A video feed management (VDM) application 524 is stored in the memory 506. The VDRM application 524 includes instructions accessible by the one or more processors 504 to direct a processor 504 to implement the methods, processes and operations described herein including, but not limited to the methods, processes and operations illustrated in the Figures and described in connection with the Figures. The VDM application 524 manages operation of the processor 504, display driver 550 and/or a video card in connection with embodiments herein.

Other applications stored in the memory 506 include various application program interfaces (APIs), some of which provide links to/from the cloud hosting service. The power module 512 preferably includes a power supply, such as a battery, for providing power to the other components while enabling the device 500 to be portable, as well as circuitry providing for the battery to be recharged. The component interface 514 provides a direct connection to other devices, auxiliary components, or accessories for additional or enhanced functionality, and in particular, can include a USB port for linking to a user device with a USB cable.

A display driver 550 is coupled to the processor 504 and configured to manage display of content on a display 552. Optionally, the display driver 550 includes display memory 554 and one or more display control processors 556. The display memory 554 includes multiple sections, to which the display control processors 556 and/or processor 504 write content to be displayed. Optionally, the display driver 550 may omit a separate processor and memory, and alternatively or additionally, utilize sections of the memory 506 as display memory and the processor 504 to manage writing content to a display memory section within the memory 506.

In accordance with at least one embodiment herein, to the extent that mobile devices are discussed herein, it should be understood that they can represent a very wide range of devices, applicable to a very wide range of settings. Thus, by way of illustrative and non-restrictive examples, such devices and/or settings can include mobile telephones, tablet computers, and other portable computers such as portable laptop computers.

Closing Statements

Before concluding, it is to be understood that although e.g., a software application for undertaking embodiments herein may be vended with a device such as the system 100, embodiments herein apply in instances where such an application is e.g., downloaded from a server to a device over a network such as the Internet. Furthermore, embodiments herein apply in instances where e.g., such an application is included on a computer readable storage medium that is being vended and/or provided, where the computer readable storage medium is not a carrier wave or a signal per se.

As will be appreciated by one skilled in the art, various aspects may be embodied as a system, method or computer (device) program product. Accordingly, aspects may take the form of an entirely hardware embodiment or an embodiment including hardware and software that may all generally be referred to herein as a "circuit," "module" or "system." Furthermore, aspects may take the form of a computer (device) program product embodied in one or more computer (device) readable storage medium(s) having computer (device) readable program code embodied thereon.

Any combination of one or more non-signal computer (device) readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a dynamic random access memory (DRAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection. For example, a server having a first processor, a network interface, and a storage device for storing code may store the program code for carrying out the operations and provide this code through its network interface via a network to a second device having a second processor for execution of the code on the second device.

The units/modules/applications herein may include any processor-based or microprocessor-based system including systems using microcontrollers, reduced instruction set computers (RISC), application specific integrated circuits (ASICs), field-programmable gate arrays (FPGAs), logic circuits, and any other circuit or processor capable of executing the functions described herein. Additionally or alternatively, the units/modules/controllers herein may represent circuit modules that may be implemented as hardware with associated instructions (for example, software stored on a tangible and non-transitory computer readable storage medium, such as a computer hard drive, ROM, RAM, or the like) that perform the operations described herein. The above examples are exemplary only, and are thus not intended to limit in any way the definition and/or meaning of the term "controller." The units/modules/applications herein may execute a set of instructions that are stored in one or more storage elements, in order to process data. The storage elements may also store data or other information as desired or needed. The storage element may be in the form of an information source or a physical memory element within the modules/controllers herein. The set of instructions may include various commands that instruct the units/modules/applications herein to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. A computer implemented method, comprising:
   under control of one or more processors configured with executable instructions,
   receiving video feeds from corresponding cameras distributed at different positions and orientations throughout a physical environment;
   obtaining location data associated with the cameras, the location data indicative of at least one of the position or the orientation for the corresponding cameras;
   obtaining a supplemental image that includes each of the corresponding cameras and is captured by a supplemental camera;
   identifying the position or the orientation of each of the corresponding cameras based on the supplemental image;
   identifying, from the multiple cameras, a camera combination that includes first and second cameras that have overlapping fields of view (FOV) based on the position or the orientation of each of the corresponding cameras; and
   forming a panoramic video of at least a portion of the environment by combining the content from the first and second cameras identified based on the position or the orientation of each of the corresponding cameras.

2. The method of claim 1, wherein the location data is obtained independent of content of the video feeds from the cameras.

3. The method of claim 1, wherein the location data is obtained without comparing the content from any of the video feeds with one another.

4. The method of claim 1, wherein at least one of the multiple cameras moves within the environment while capturing the corresponding video feeds.

5. The method of claim 1, further comprising:
   receiving distance information from range sensors, the distance information indicative of a distance from the corresponding range sensor to objects within the FOV of the corresponding cameras; and
   analyzing the distance information associated with the cameras to calculate the location data for the corresponding cameras.

6. The method of claim 5, further comprising comparing the distance information associated with the first and second cameras to calculate the position and orientation of at least the second camera relative to at least one of i) a reference origin and orientation or ii) the position and orientation of the first camera.

7. The method of claim 1, wherein the obtaining the location data further comprises calculating the location data based on information from at least one of geolocation device or gyroscopic devices associated with the cameras.

8. The method of claim 7, further comprising receiving at least one of time-of-flight (ToF) or distance information from the geolocation devices associated with the cameras; and analyzing the at least one of ToF or distance information associated with the cameras to calculate the location data for the corresponding cameras.

9. The method of claim 1, further comprising:
presenting a graphical representation of the physical environment on a display, the representation including camera graphical representations of the cameras;
receiving at least one of a position or orientation adjustment input at a user interface indicating an adjustment to at least one of a position or orientation of the camera graphical representation on the display; and
utilizing at least one of the position or orientation information to calculate the location data.

10. The method of claim 1, wherein the panoramic video represents an interactive augmented reality environment.

11. A system, comprising:
a video input configured to receive video feeds from corresponding cameras distributed at different positions and orientations throughout a physical environment;
a processor; and
a memory storing instructions accessible by the processor, wherein, responsive to execution of the instructions, the processor configured to:
obtain location data associated with the cameras, the location data indicative of at least one of the position or orientation for the corresponding cameras;
obtaining a supplemental image captured by a supplemental camera;
identifying each of the corresponding cameras based on the supplemental image;
identifying the position or the orientation of each of the corresponding cameras based on the supplemental image;
identify, from the multiple cameras, a camera combination that includes first and second cameras that have overlapping fields of view (FOV) based on the position or the orientation of each of the corresponding cameras; and
form a panoramic video of at least a portion of the environment by combining the content from the first and second cameras identified based on the position or the orientation of each of the corresponding cameras.

12. The system of claim 11, wherein the processor is further configured to obtain the location data without comparing the content from any of the video feeds with one another.

13. The system of claim 11, further comprising the multiple cameras, the multiple cameras configured to remain stationary within the environment while capturing the corresponding video feeds.

14. The system of claim 11, wherein the processor is further configured to:
receive distance information from range sensors, the distance information indicative of a distance from the corresponding range sensor to objects within the FOV of the corresponding cameras; and
analyze the distance information associated with the cameras to calculate the location data for the corresponding cameras.

15. The system of claim 14, wherein the processor is further configured to: compare the distance information associated with the first and second cameras to calculate the position and orientation of at least the second camera relative to at least one of i) a reference origin and orientation or ii) the position and orientation of the first camera.

16. The system of claim 11, wherein the processor is further configured to: receive at least one of time-of-flight (ToF) or distance information from geolocation devices associated with the cameras; and analyze the at least one of ToF or distance information associated with the cameras to calculate the location data for the corresponding cameras.

17. The system of claim 11, further comprising:
a display configured to present a graphical representation of the physical environment, the representation including camera graphical representations of the cameras; and
a user interface configured to receive at least one of a position or orientation adjustment input indicating an adjustment to at least one of a position or orientation of the camera graphical representation on the display, the processor further configured to utilize at least one of the position or orientation information to calculate the location data.

18. A computer program product comprising a non-signal computer readable storage medium comprising computer executable code to:
receive video feeds from corresponding cameras distributed at different positions and orientations throughout a physical environment;
obtain location data associated with the cameras, the location data indicative of at least one of the position or orientation for the corresponding cameras;
obtaining a supplemental image captured by a supplemental camera;
identifying each of the corresponding cameras based on the supplemental image;
providing a user an input to designate which video feed of the video feeds corresponds to each of the corresponding cameras identified;
identifying the position or the orientation of each of the corresponding cameras based on the supplemental image;
identify, from the multiple cameras, a camera combination that includes first and second cameras that have overlapping fields of view (FOV) based on the position or the orientation of each of the corresponding cameras; and
form a panoramic video of at least a portion of the environment by combining the content from the first and second cameras identified based on the position or the orientation of each of the corresponding cameras.

19. The computer program product of claim 18, wherein the computer executable code is further to:
receive distance information from range sensors, the distance information indicative of a distance from the corresponding range sensor to objects within the FOV of the corresponding cameras; and
analyze the distance information associated with the cameras to calculate the location data for the corresponding cameras.

20. The computer program product of claim 18, wherein the computer executable code is further to:
- present a graphical representation of the physical environment on a display, the representation including camera graphical representations of the cameras;
- receive at least one of a position or orientation adjustment input at a user interface indicating an adjustment to at least one of a position or orientation of the camera graphical representation on the display; and
- utilize at least one of the position or orientation information to calculate the location data.

* * * * *